United States Patent [19]

Marshall

[11] Patent Number: 4,526,388
[45] Date of Patent: Jul. 2, 1985

[54] ONE-PIECE SEALING RING FOR A SHAFT

[75] Inventor: Charles R. Marshall, Warwick, R.I.

[73] Assignee: Dixon Industries Corporation, Bristol, R.I.

[21] Appl. No.: 611,122

[22] Filed: May 17, 1984

[51] Int. Cl.³ .............................................. F16J 15/08
[52] U.S. Cl. .................................... 277/206; 277/220
[58] Field of Search ............... 277/206, 220, 221, 222, 277/125

[56] References Cited

U.S. PATENT DOCUMENTS

| 1,436,774 | 11/1922 | Mummert | 277/220 |
| 1,532,938 | 4/1925 | Peeler | 277/220 |
| 2,420,039 | 5/1947 | Frisby | 277/206 |
| 2,759,777 | 8/1956 | Anderson | 277/221 |
| 2,964,343 | 12/1960 | Klingler | 277/206 |
| 3,316,940 | 5/1967 | Gratzmuller | 277/125 |
| 3,837,687 | 9/1974 | Leonard | 277/125 |

OTHER PUBLICATIONS

Perry's Chemical Engineers' Handbook (Fourth Ed., 1963), pp. 6-32 through 6-34.

Primary Examiner—Robert I. Smith
Attorney, Agent, or Firm—Morgan, Finnegan, Pine, Foley & Lee

[57] ABSTRACT

A one-piece, self-lubricating thermoplastic sealing ring is disclosed. The sealing ring provides two separate wiping actions on a reciprocating and/or rotating shaft when mounted thereon and can be easily placed on or removed from the shaft without disassembling the entire machine in which the shaft is located. Two radial cuts in oppositely facing radial walls of the ring intersect opposite ends, respectively, of a transverse cut along a circumferential wall of the ring. The three cuts enable the ring to be twisted open and placed around the shaft while both ends of the shaft are fixed in position, then closed about the shaft, before being inserted into a seal housing. A seal ring retainer may be used to control the pressure the seal exerts on the shaft. A cavity, preferably an annularly shaped cavity, in the seal ring, the cuts in the radial walls, and the circumferential wall of the ring also define a leak path through the seal ring which requires fluid leaking into one of the radial cuts to fill the cavity within the seal ring before leaking out of the other radial cut.

10 Claims, 4 Drawing Figures

ONE-PIECE SEALING RING FOR A SHAFT

BACKGROUND OF THE INVENTION

1. Field of the Invention

This invention relates to seals for reciprocal and rotary shafts.

2. Description of the Prior Art

Various seals for reciprocal shafts, in pumps, fans, compressors, agitators and the like are known. A common type of shaft seal consists of packing composed of fibers which are first woven, twisted or braided into strands, and then formed into coils, spirals or rings. Common materials used are asbestos fabric, braided and twisted asbestos, rubber and duck, flax, jute and metallic braids.

Packings are lubricated to facilitate installation and extend the life of the packing. Lack of lubrication causes packing to become hard and lose its resiliency, thus increasing friction, shortening packing life, and increasing operating costs. Various means are known for lubricating packing rings such as providing a lantern ring or permitting a small amount of leakage through the packing. Packing rings permit seals to be adjusted or replaced without disassembly of major components. However, the major disadvantage of packing type seals are the necessity for frequent adjustment and the quantity of fluid flow required to lubricate them.

Compression packing rings cut with bevel joints have been used. The bevel permits a certain amount of sliding action, thus absorbing a portion of ring expansion.

SUMMARY OF INVENTION

Object of the Invention

It is an object of this invention to provide a sealing ring, the inner diameter of which defines two wiping surfaces which contact the outer diameter of a shaft and provide sealing engagement therewith.

An object of this invention is to provide a one-piece, thermoplastic sealing ring which is self-lubricating in use and which maintains an effective seal with minimum frictional drag between the sealing ring and a shaft moving relative thereto.

An object of this invention is to provide a thermoplastic sealing ring which is durable and has two radially extending surfaces which can be flexed upon application of pressure thereto to maintain a sealing engagement between the sealing rings and the outer diameter of a shaft while compensating for such wear as does occur.

An object of this invention is to provide a sealing ring which can be easily removed from or mounted on a shaft in situ without requiring disassembly of major components in a machine.

An object of this invention is to provide a sealing ring having a step-cut partially therethrough which defines a leak path through an annular cavity or groove in the seal and avoids a straight leak path through the seal, the sealing ring having an annularly shaped cavity or groove therewithin which must be substantially filled before any through leakage occurs.

Other objects and advantages of this invention will become apparent from the following description of preferred embodiments thereof read in conjunction with the accompanying drawings in which like parts bear like reference numerals.

DETAILED DESCRIPTION OF THE INVENTION

Figure 1:
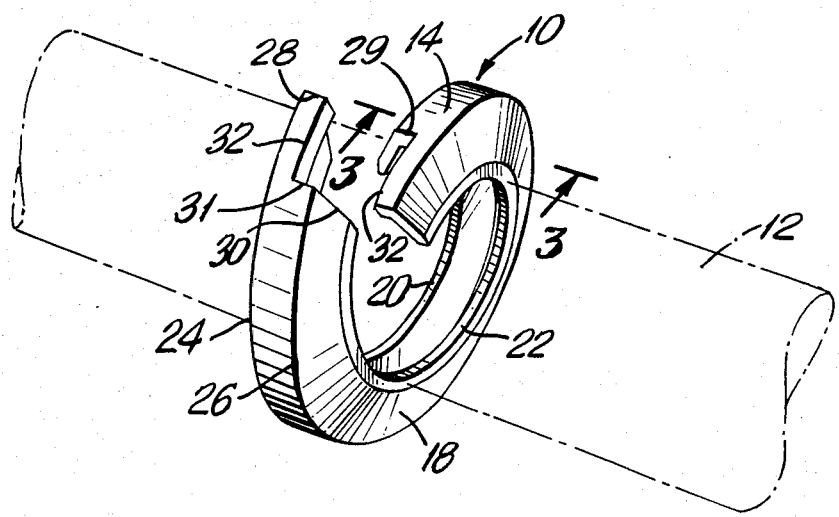
FIG. 1 is a perspective view of the sealing ring shown being mounted on a shaft.
Figure 2:
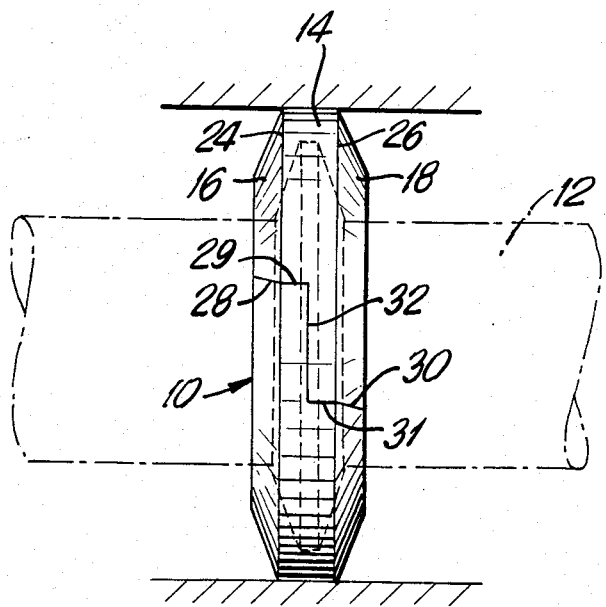
FIG. 2 is an elevation view of the sealing ring in its closed position.
Figure 3:
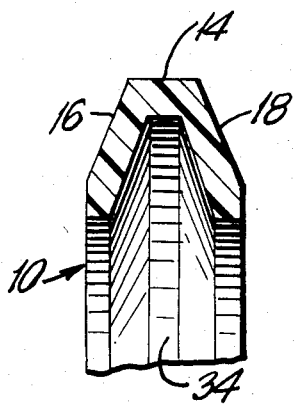
FIG. 3 is a partial sectional view taken along lines 3—3 of FIG. 1.

By referring to the drawings and FIGS. 1, 2 and 3 in particular, it will be seen that a one-piece sealing ring 10 is shown mounted on a shaft 12. The inner diameter of the sealing ring 10 is sized to be mounted on and contact the outer diameter of the shaft 12 to provide two sealing surfaces therebetween. The shaft 12 is coaxially aligned with the sealing ring 10 for reciprocal movement along its longitudinal axis.

Sealing ring 10 has a circumferential planar wall 14 and oppositely facing radial planar walls 16 and 18. Inner edges 20 and 22 of the radial walls 16 and 18, respectively, define two surfaces of the inner diameter of the sealing ring 10 which contact the outer diameter of the shaft 12 when the sealing ring is mounted on the shaft 12. The two edges 20 and 22 also provide wiping actions on the reciprocating shaft 12.

The circumferential wall 14 has first and second edges 24 and 26, respectively. The circumferential wall 14 is substantially coaligned with the longitudinal axis of the sealing ring 10. Outer edges of the radial walls 16 and 18 intersect the first and second edges 24 and 26, respectively of circumferential wall 14.

Radial walls 16 and 18 have been cut to form beveled joints at their respective intersections with the respective edges 24 and 26 of the circumferential wall 14. The bevel permits radial walls 16 and 18 to flex upon application of pressure at an angle substantially parallel to the longitudinal axis of the shaft 12. The flexing flattens the radial walls in a plane substantially perpendicular to the longitudinal axis of the sealing ring 10 and causes edges 20 and 22 of radial walls 16 and 18, respectively, to be urged against the outer diameter of the shaft 12, providing two sealing engagements therebetween.

Radial walls 16 and 18 have radial cuts 28 and 30, respectively, extending therethrough. The cuts 28 and 30 are not aligned. Radial cuts 28 and 30 further extend through portions of the circumferential wall 14, shown in FIGS. 1 and 2 as cuts 29 and 31, respectively. The circumferential wall 14 has a transverse cut 32 therethrough along its circumference. Opposite ends of the transverse cut 32 intersect radial cuts 29 and 31. The radial cuts 28, 29, 30 and 31 and the transverse cut 32 enable the sealing ring 10 to be twisted open (FIG. 1) for mounting on or removal from around shaft 12.

The inner surfaces of radial wall 16 and 18 and the circumferential wall 14 define an annular groove 34 within the sealing ring 10. When a fluid such as oil leaks into the sealing ring 10 through a radial cut, e.g., cuts 28 and 29, the fluid does not have a straight leak path through the seal ring 10. Rather, fluid leakage into the sealing ring 10 must pass through the annular cavity or groove 34 and fill up such cavity or groove before it can pass out of the sealing ring through radial cuts 30 and 31. When more than one sealing ring 10 is employed in a seal retainer, the radial cuts can be staggered by rotating sealing rings which are adjacent to one another so that no two adjacent radial cuts are aligned. This will further minimize leakage through the sealing rings.

The sealing ring 10 is made of a fluoroplastic such as polytetrafluoroethylene (PTFE); or PTFE containing a wear resistant filler such as polyimide, glass fibers, bronze, carbon, graphite or the like. Particularly preferred is a virgin PTFE or the PTFE disclosed in U.S. Pat. No. 3,652,409. Other suitable fluoroplastics include a perfluoroalkoxy resin having the following repeating units:

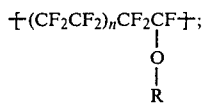

wherein R is $C_nF_{2n+1}$ and n is an integer $\geq 1$; a fluorinated ethylenepropylene (FEP) having the following repeating units:

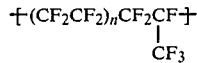

wherein R is an integer $\geq 1$ (melting point of about 310° C.); ethylene-chlorotrifluoroethylene copolymer (ECTFE) (melting point of about 245° C. and a density of 1.68 g/cc) which is predominantly 1:1 alternating copolymer product of copolymerizing ethylene and chlorotrifluoroethylene and consisting of linear chains with the predominate repeating units:

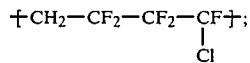

ethylene-tetrafluoroethylene copolymer (melting point of about 270° C. and a density of 1.70 g/cc) which is predominantly 1:1 alternating copolymer of ethylene and tetrafluoroethylene and consisting of linear chains with the repeating unit $CH_2-CH_2-CF_2-CF_2$; and polyvinylidene fluoride (melting point of 170° C. and a density of 1.78 g/cc.)

PTFE and PTFE containing a wear-resistant material are preferred materials for the sealing ring of this invention because of their low frictional properties, their memory, their chemical inertness, and their thermal properties. A fluoroplastic material such as PTFE is molded or machined into the desired ring-like shape and radial cuts 28, 29, 30, 31 and transverse cut 32 are made in the sealing ring.

A typical assembly of the sealing ring 10 of this invention in an air compressor is described hereinafter for illustrative purposes.

Figure 4:
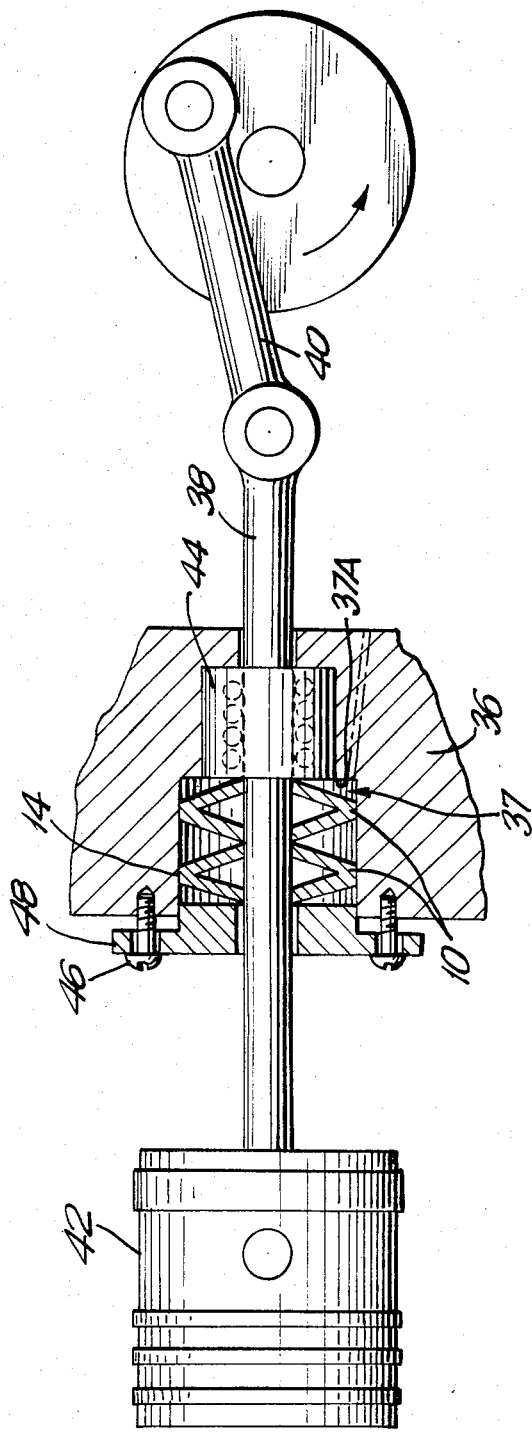
FIG. 4 is a cross-sectional view of two sealing rings according to this invention mounted on a reciprocating shaft in a compressor assembly.

Referring to FIG. 4, two sealing rings 10 of this invention are shown in parallel alignment, in series and in situ in a compressor assembly. The circumferential walls 14 of the sealing rings 10 are rotated so that adjacent radial cuts are not aligned. The sealing rings 10 are placed on a shaft and slid along the shaft into a recess in a housing 36, the walls 37 and 37A of the recess contacting and limiting the movement of the circumferential walls 14 of the sealing ring in a direction transverse to the longitudinal axis of a piston shaft 38, and also limiting axial movement of the sealing rings 10 in a direction along the longitudinal axis of the outer diameter of the piston shaft 38 away from the piston 42. The inner diameters of the sealing rings 10 provide sealing engagements with the outer diameter of the piston shaft 38. The piston shaft 38 is actuated by crank arm 40 and drives compressor piston 42.

Also mounted on the piston shaft 38 is a bearing 44, adjusting screws 46 and cap 48. The bearing 44 supports the piston shaft 38 from the housing 36. Adjusting screws 46 and cap 48 limit axial movement of the sealing rings 10 along the longitudinal axis of the piston shaft 38 in a direction toward the piston 42. Together, the adjusting screws 46, cap 48 and walls 37, 37A of the recess in the housing 36 lock the sealing rings 10 in situ onto the piston shaft 38.

Tightening of the adjusting screws 46 applies pressure to radial walls of these sealing rings 10 at an angle substantially parallel to the longitudinal axis of the piston shaft 38. The pressure causes the radial walls to flex and flatten in a plane substantially perpendicular to the longitudinal axis of the sealing rings 10 as discussed previously herein. This flattening of the radial walls causes the inner diameter of the sealing rings 10, i.e., the inner circumferential walls thereof, to be urged against the outer diameter of the piston shaft 38, providing two sealing engagements therebetween.

When it is desired to change the seal rings 10, the adjusting screws 46 are removed and the cap 48 is slid up the shaft. Then, the sealing rings 10 can be pulled out of the recess in housing 36 that they are contained in. The sealing rings 10 are slid along the shaft until they are out of the recess that they are contained in. Then, the sealing rings 10 can be twisted open manually and removed from the piston shaft 38. New sealing rings 10 then can be placed in position, the cap 48 and adjusting screws 46 replaced and retightened. This in situ disassembly and installation allows the compressor to go back into service quickly without a major disassembly or overhaul.

It will be apparent to those skilled in the art that various changes, modifications and uses of the present invention are possible without departing from the spirits of the invention or the scope of the appended claims in light of the above teachings.

What is claimed is:

1. A one-piece, self-lubricating thermoplastic sealing ring for a reciprocating or rotating shaft, the sealing ring having an inner diameter which is sized to be mounted on and contact the outer diameter of said shaft to provide a seal therebetween;

said ring having a circumferential planar wall with first and second edges;

said ring having first and second radial planar walls, the outer edges of said first and second radial walls intersecting, respectively, said first and second edges of said circumferential wall, said first and second radial walls being cut to form a beveled joint at their respective intersections with said edges of said circumferential wall;

each of said first and second radial walls having a radial cut extending therethrough, said radial cuts in each of said first and second radial walls also extending through said first and second edges, respectively, and through a portion of said circumferential wall having a transverse cut therethrough along its circumference, the opposite ends of said transverse cut intersecting the radial cuts in said first and second radial walls, the first and second radial walls and said circumferential wall defining an annular shaped cavity within said ring, said radial cuts and said transverse cut enabling said ring to be twisted open and mounted on or removed from around said shaft;

said radial cuts in said first and second radial walls and said annular cavity defining a leak path through the sealing ring which requires fluid leaking into one of said radial cuts to fill said annular cavity before leaking out of the other radial cut;

said radial walls flexing upon application of sufficient pressure thereto at an angle parallel to the longitudinal axis of the shaft and upon application of sufficient pressure to said circumferential wall at right angles to the longitudinal axis of the shaft so that said inner diameter is urged radially inwardly.

2. A sealing ring as defined in claim 1 wherein said thermoplastic is a fluoroplastic selected from the group consisting of polytetrafluoroethylene containing up to 60 percent by weight of a wear resistant filler selected from polyimide, glass fibers, bronze, carbon, and graphite; a perfluoroalkoxy resin having the following repeating units:

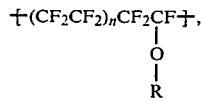

wherein R is $C_nF_{2n+1}$ and n is an integer $\geq 1$; a fluorinated ethylenepropylene having the following repeating units:

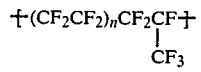

wherein R is an integer $\geq 1$; ethylene-chlorotrifluoroethylene copolymer, ethylene-tetrafluoroethylene copolymer; and polyvinylidene fluoride.

3. A sealing member as defined in claim 2 wherein said fluoroplastic comprises polytetrafluoroethylene containing up to 60 percent by weight of a wear resistant filler selected from polyimide, glass fibers, bronze, carbon or graphite.

4. A sealing member as defined in claim 3 wherein said fluoroplastic comprises polytetrafluoroethylene.

5. A sealing mechansim for sealing against fluid leakage along a moveable shaft in a machine assembly that operates under differential pressure, said sealing mechanism comprising:
a. a housing;
b. a moveable shaft located in said housing, said shaft capable of moving axially along its longitudinal axis and/or rotating about said longitudinal axis;
c. at least one one-piece, self-lubricating thermoplastic sealing ring mounted on said shaft and sized so that the inner diameter of said ring contacts the outer diameter of said shaft to provide a seal therebetween;

said ring having a circumferential planar wall with first and second edges;

said ring having first and second radial planar walls, the outer edges of said first and second radial walls intersecting, respectively, said first and second edges of said circumferential wall, said first and second radial walls being skived to form a beveled joint at their respective intersections with said edges of said circumferential wall;

each of said first and second radial walls having a radial cut extending therethrough, said radial cuts in each of said first and second radial walls also extending through said first and second edges, respectively, and through a portion of said circumferential wall having a transverse cut therethrough along its circumference, the opposite ends of said transverse cut intersecting the radial cuts in said first and second radial walls, the first and second radial walls and said circumferential wall defining an annular shaped cavity within said ring, said radial cuts and said transverse cut enabling said ring to be twisted open and mounted on or removed from around said shaft;

said radial cuts in said first and second radial walls and said annular cavity defining a leak path through the sealing ring which requires fluid leaking into one of said radial cuts to fill said annular cavity before leaking out of the other radial cut;

said radial walls capable of flexing upon application of sufficient pressure thereto at an angle parallel to the longitudinal axis of the shaft and upon application of sufficient pressure to said circumferential wall at right angles to the longitudinal axis of the shaft so that said inner diameter is urged radially inwardly;

d. a plurality of retaining means located in said housing for preventing axial movement of said sealing ring along the longitudinal axis of said shaft, at least one of said retaining means preventing axial movement of said sealing ring in one direction, and at least another of said retaining means being capable of axial movement along the longitudinal axis of said shaft from an initial position into a predetermined position, and when in said predetermined position, said retaining means prevents axial movement of said sealing ring in the other direction and also applies sufficient pressure to said radial walls of said sealing ring to cause said walls to move in a radially inward direction and be urged against the outer diameter of said shaft in sealing relationship; and e. a plurality of retaining means located in said housing for preventing a rotational movement of said sealing ring about the longitudinal axis of said shaft and also preventing radially outward movement of said radial walls of said sealing ring.

6. A sealing mechanism as defined in claim 5 wherein said retaining means for preventing axial movement of said sealing ring along the longitudinal axis of said shaft and said retaining means for preventing rotational movement of said sealing ring about the longitudinal axis of said shaft comprises a recess in said housing, said recess having walls which abut at least portions of the outer diameter of said sealing ring and one radial wall thereof.

7. A sealing mechanism as defined in claim 5 wherein said retaining means for preventing axial movement of said sealing ring along the longitudinal axis of said shaft in the other direction comprises a threaded screw means capable of being removeably mounted about said shaft and moved axially from said initial position into said predetermined position; and a retaining cap which is capable of being removably mounted on said screw means and locking said screw means into said predetermined position.

8. A sealing mechanism as defined in claim 5 wherein said thermoplastic material of said sealing ring is a fluoroplastic selected from the group consisting of polytetrafluoroethylene containing up to 60 percent by weight of a wear resistant filler selected from polyimide, glass fibers, bronze, carbon, and graphite; a perfluoroalkoxy resin having the following repeating units:

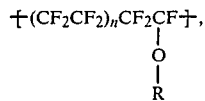

wherein R is $C_nF_{2n+1}$ and n is an integer $\geq 1$; a fluorinated ethylenepropylene having the following repeating units:

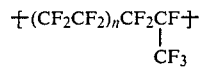

wherein R is an integer $\geq 1$; ethylene-chlorotrifluoroethylene copolymer, ethylene-tetrafluoroethylene copolymer; and polyvinylidene fluoride.

9. A sealing mechanism as defined in claim 8 wherein said thermoplastic is polytetrafluoroethylene containing up to 60 percent by weight of a wear resistant filler selected from polyimide, glass fibers, bronze, carbon or graphite.

10. A sealing mechanism as defined in claim 5 including at least two sealing rings co-axially aligned in series in abutting relationship with one another on said shaft, the radial and transverse cuts in a first one of said sealing rings not being aligned with the radial and transverse cuts of a second one of said sealing rings.

* * * * *